Jan. 10, 1956     C. C. SWANN     2,730,455
METHOD OF COATING FIBERS, THREADS, AND/OR FILAMENTARY MATERIAL
Filed Oct. 30, 1952
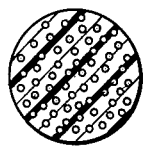
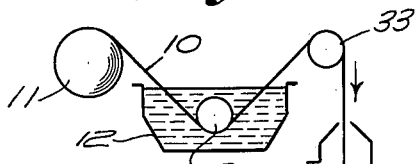
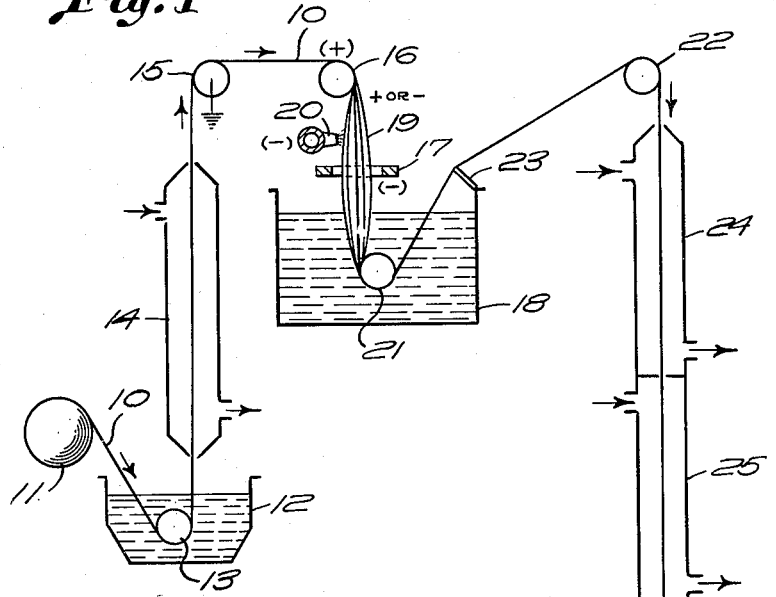
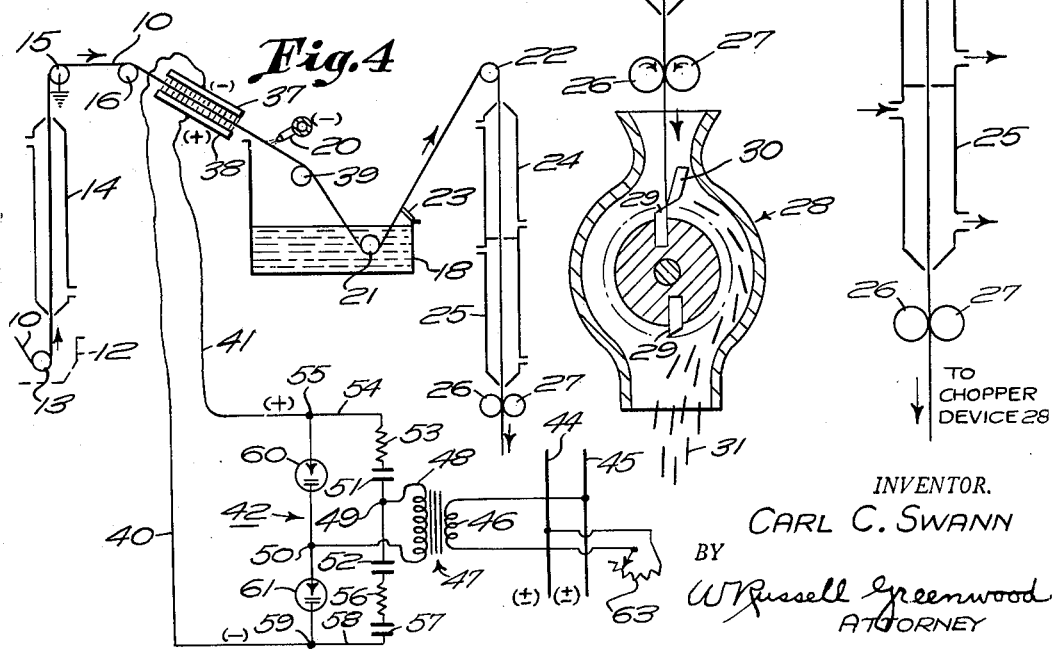
INVENTOR.
CARL C. SWANN
BY W. Russell Greenwood
ATTORNEY

United States Patent Office 2,730,455
Patented Jan. 10, 1956

2,730,455

METHOD OF COATING FIBERS, THREADS, AND/OR FILAMENTARY MATERIAL

Carl C. Swann, Riverside, R. I.

Application October 30, 1952, Serial No. 317,638

4 Claims. (Cl. 117—4)

This invention relates to improvements in methods of producing coated fibers in the form of threads, filamentary material and the like, and, more especially, to the manufacture of products for plastic reinforcement composed of resin or plastic coated glass fibers adaptable for use in various plastics molding applications, such as for use as an injection molding material, etc. More particularly, the invention is concerned with an electrostatic method of coating glass fibers in continuously running threads or roving composed of continuous filament glass strands with emulsions or highly liquid forms of plastic or resinous materials whereby the surfaces of the individual glass fibers or filaments reinforcing the end product will be coated uniformly and they will be separated one from the other therein by their resin coatings with the result that great strength and dimensional stability will be added to the thus-reinforced end product.

In the manufacture of end products of the class incorporating therein such coated glass fibers as a plastics reinforcing material it is found that the coated glass fibers produced by the usual coating processes do not become coated uniformly on all sides with the coating material. The uncoated portions of adjoining glass fibers in such end products often are in contact with each other therein and because of the natural abrasive characteristic of glass fibers this glass-to-glass contact of the fibers cause them to disintegrate quickly with the result that the glass fibers become an adulterant rather than a reinforcing material in the final product. It is therefore desirable in such final product that the coating material penetrate the interior of the array or bundle of reinforcing threads or roving whereby all the separate strands of glass fibers will be coated completely and uniformly and not superficially and thus eliminate the aforementioned detrimental result and insure the continued functioning of the coated glass fibers as reinforcing bodies since all would be covered satisfactorily with uniform coatings of the applied material. Consequently such a coated glass fiber reinforced product when later use in pellet form as a molding material in injection or other plastic molding processes would have little or no detrimental effect on the operating life of the equipment or dies being used.

It is accordingly the principal object of this invention to provide an improved method for coating the surfaces of an aggregate of glass fibers uniformly with a liquid or highly plastic form of the moldable resin material by which such reinforcing fibers are encased and bonded into an integral structural body, and further to provide a method capable of coating especially the outer surface of each of a large number of glass fibers which make up a continuously travelling thread, or a roving constituted of a multiplicity of such threads or composed of a considerable number of ends of continuous filament glass strands, which coated product is later reduced by chopping into small pieces or pellets.

In its broad aspects, the improved coating method of this invention comprises the steps of subjecting continuously running threads or roving composed of continuous filament glass strands to the action of a high potential electrostatic field in such a manner as to induce charges of static electricity in the travelling threads or filamentary material which whereby the fibers become widely spread apart or ballooned out, removing the fibers from the region of the electrostatic field and while preserving them thus-separated applying a precoating material thereto, and delivering the coated threads or filamentary material so separated into a bath for applying further coatings of a moldable resin binding material thereto which when subsequently dried and set bonds the coated threads or filamentary material into an integral structural product adaptable for plastic molding processes when cut into small pieces or pellets.

The invention will be more fully understood by reference to the accompanying drawing, in which:

Fig. 1 is a diagrammatic representation of one form of apparatus which may be utilized in practicing the method of my invention;

Fig. 2 shows a modification;

Fig. 3 is a cross-sectional view, on enlarged scale, of a typical end product reinforced with glass fibers coated in accordance with my improved method, and showing the individual fibers dispersed in the coating media; and Fig. 4 shows another modification by which the process may be carried out.

With reference particularly to Fig. 1, the aggregate or bundle of continuous glass fibers or long fine attenuated filaments 10 is drawn off supply beam 11, in the form of either a single thread containing a multiplicity of attenuated glass fibers or filaments, or as a roving made up of any number of such threads disposed in a more or less parallelized relationship one to the other, and proceeds at a constant rate and at high speed downwardly into a bath 12 containing a suitable liquid solvent media capable of removing any binder, such as, for example, a coating of wax or of heat treated dextrinized starch, which may have been previously applied as an adherent coating on the extruded glass streams to bond the individual attenuated fibers in strand form during subsequent setting or solidification thereof after they leave the numerous extrusion orifices of the spinneret (not shown) in being produced according to a customary manufacturing process. The glass fibers in such an aggregate or bundle have a determined and controlled diameter which is of the order of 0.001 inch and less. The continuous travelling threads or roving 10 after entering the bath 12 is drawn over the underside of roll 13 and then moves upwardly through and out of the bath 12 and thence upwardly through a suitable drying chamber 14 through which heated gas or air is circulated in order to remove the solvent used in removing the binder. From chamber 14 the dried filamentary material travels over a guide member 15 which is suitably grounded electrically, and thence over an electrode 16, and through electrode 17, the purpose of which will be hereinafter disclosed and is passed downwardly into and through a coating bath 18 containing the desired moldable resin binder material for coating the individual glass fibers of the threads or roving. During their passage from between electrodes 16 and 17 into coating bath 18, the running glass fibers or filaments by reason of their induced electrostatic charges assume a ballooned or widely spread out condition laterally of the moving mass, as indicated at 19 in Fig. 1 at which time they may be subjected to a spray of the same coating material as that employed in bath 18, as by means of nozzle 20, for the purpose of at least insuring that the individual filaments will be uniformly coated with the coating material on all sides before receiving the main or heavier resin binder coating by treatment in bath 18.

The coated filamentary material passes over the underside of the guide element 21 in the bath 18 and thence travels upwardly out of the bath to a guide element 22, the coated thread or threads being engaged by a suitable stripping element 23 in the path of travel of the running material between the bath and the guide element 22 whereby excess moldable resin coating material will be stripped or scraped from the wetted threads or roving. From the guide element 22 the coated filamentary material is passed through a series of chambers 24 and 25 which act successively on the continuously moving filamentary material, the first chamber 24 functioning to remove any water or solvents from the coated threads or roving and the second chamber 25 acting thereon to set or cure and dry the coated threads or roving whereby the coatings will adhere more tenaciously thereon. The chambers 24 and 25 may be formed as two communicating vertical compartments in a single apparatus unit having aligned openings through which the filamentary material passes through the unit as here shown wherein the chamber 24 forms the upper part thereof and the chamber 25 its lower part, but they need not be limited to this construction since they may comprise separate apparatus units. Chamber 24 may utilize heated gas or air at a proper temperature circulated therethrough as indicated by the arrows for evaporating the water or solvents from the coated thread or threads passing therethrough. After passing downwardly through the chambers 24 and 25 and out of chamber 25 the set or cured filamentary material is passed between feed rolls 26 and 27 and finally is directed into a chopping machine 28, as diagrammatically represented in Fig. 1, having rotary cutters 29 alternately coacting with a stationary cutter blade 30 for cutting the running filamentary material fed thereto into pellets or short pieces as indicated at 31.

Referring now to the arrangement shown in Fig. 2 in which the apparatus is essentially the same as shown in Fig. 1 except that the system of chambers thereof is arranged vertically with respect to each other, the threads or strands of filamentary material 10 being passed through and out of bath 12, over guide element 33, vertically downwardly to pass successively through chamber 14, against static electrode 16 and through electrode 17, thence through coating bath 18 and out therefrom through an opening 34 of suitable size in the bottom thereof, thence through chambers 24 and 25, and finally between feed rolls 26 and 27, after which it is directed to a chopping device 28. In the systems depicted in Figs. 1 and 2, the speed at which the feed rolls 26 and 27 revolve is suitably adjusted whereby the tension of the running filamentary material pulled thereby will be uniform and at a high constant speed yet will permit the threads or filaments to be ballooned or spread out in passing from the static electrode 16 through electrode 17 and into the bath 18.

In Fig. 4 another modified arrangement is shown by which the process of the invention may be carried out. As shown in this figure, the general system of chambers is essentially the same as that shown in Fig. 1 except that the running threads or filamentary material 10, after passing through and out of the bath 12, as partially indicated in broken outline, then upwardly through chamber 14, and over successive guide members 15 and 16 to the coating bath 18, is passed after leaving guide member 16 through an electrostatic field provided by a pair of opposed plate-electrodes 37 and 38 between which the filamentary material travels in its movement from guide member 16 and over guide element 39 to coating bath 18. After emerging from bath 18, the coated threads or strands of filamentary material travels upwardly to guide member 22 during which movement it is stripped by the element 23 of any excess coating material. The filamentary material then passes over guide member 22 and moves downwardly through chambers 24 and 25, thence between feed rolls 26 and 27 from which it is directed to a suitable machine for cutting it into short pieces or pellets, such as a chopping device 28 as shown in Fig. 1.

In the arrangement shown in Fig. 4 the electrodes 37 and 38 are connected by suitable conductors 40 and 41 to a suitable source of potential, here shown as a two-tube Kenotron rectifier designated generally by the numeral 42, the plate-electrode 37 being connected by conductor 40 to the negative terminal of the Kenotron and the plate-electrode 38 to the positive terminal of this rectifier by conductor 41. The plate-electrodes 37 and 38 preferably have plane surfaces which are suitably spaced from each other, and parallel to each other; and they may be of suitable shape and size and composed of a conductive metal, such as aluminum, for lightness. As illustrated, the plate-electrodes 37 and 38 are disposed at opposite sides of the path of travel of the moving threads or roving to the bath 18 and they are inclined downwardly as shown and provide an electrostatic field which extends across the path of movement of the travelling threads or strands of filamentary material therebetween to impart an electrostatic charge on the glass fibers thereof to cause them to be spread widely apart so that upon energizing in a separated state they attract and will be uniformly coated with a coating material of opposite electrical charge and received from a spray device 20 which is directed at the advancing glass threads or filaments thus separated to precoat them just before they enter the main coating bath 18.

The electrical circuit of the Kenotron 42 for providing the desired electrical potential at the electrodes 37 and 38 comprises a suitable source of alternating electric current, for example, 220 volts at 60 cycles, in supply mains 44 and 45 connected as shown with the primary winding 46 of a transformer 47. The secondary winding 48 of the transformer is connected to terminals 49 and 50. Terminal 49 is connected to one of the plates of condensers 51 and 52 respectively. The other plate of condenser 51 is connected through a resistance element 53 to a conductor 54 which is connected at output terminal 55 to conductor 41 by which a positive potential is applied to the plate-electrode 38. The other plate of condenser 52 is connected to a resistance element 56 which is connected to one plate of a condenser 57 whose other plate is connected to the conductor 58 which is connected at negative terminal 59 to conductor 40 and via it to the plate-electrode 37. Two rectifiers 60 and 61 are connected in shunt across the conductors 54 and 57 and to the terminal 50 as shown.

The potential difference at the plate-electrodes 37 and 38 ranges from about 6,000 to 70,000 volts. This voltage control is obtained by the insertion of a suitable voltage regulating device 63, such as a rheostat as hereshown, in the primary side of the transformer 47 connected with the 220 volt alternating current supply mains 44 and 45. The Kenotron power supply hereshown schematically in Fig. 4 supplies an unidirectional current to the plate-electrodes 37 and 38. Other power supply means may be substituted for the Kenotron rectifier as a source of high potential to produce the desired electrostatic field, such as, for example, a mechanical rectifier with a suitable condenser, a static machine adapted to provide a continuous (non-pulsating) current, a high voltage generator, or the like; the arrangement shown in Fig. 4, however, being one particularly suitable for providing a pulsating current. With this arrangement, the output of the Kenotron rectifier 42 may be accurately controlled by adjusting the rheostat 63 and thus the electrostatic field set up between the plate-electrodes 37 and 38 may be varied so as to attain the desired strength, density, etc.

Typical examples of coating materials for use in coating these fibers or filaments might be: (1) an aqueous solution of polystyrene; (2) unpolymerized or partially polymerized acrylic monomers; (3) cellulose acetate dissolved in acetone.

It is to be understood that the foregoing detailed description is given by way of illustration only, and not in limitation thereof, and that many changes and variations

What is claimed is:

1. In a continuous process for the production of plastic resin coated glass fibers in chopped form for plastics-reinforcing purposes wherein a continuously moving bundle of continuous filament threads or roving initially carrying a preliminary binder coating is subjected to treatment with a solvent to remove the preliminary binder followed by exposure to a hot gaseous medium to evaporate surplus solvent and then subjected to a main coating treatment by passage through a bath containing a plastic resin coating material followed by successive exposures to a hot gaseous medium to dry the wet coatings and to set and cure the plastic resin thereof after being dried, and thereafter mechanically chopping the travelling threads or roving having the cured plastic resin coatings to produce pellets or short pieces thereof adaptable for reinforcing purposes in plastics molding operations, the combination with the foregoing process steps of the step which comprises electrostatically ballooning the continuously moving bundle of threads or roving so as to produce wide lateral separation of the filaments thereof from each other as they move into the main coating bath and as thus-ballooned individually become completely coated with the plastic resin contained therein.

2. In a continuous process for the production of plastic resin coated glass fibers in chopped form for plastics-reinforcing purposes wherein a continuously moving bundle of continuous filament threads or roving initially carrying a preliminary binder coating is subjected to treatment with a solvent to remove the preliminary binder followed by exposure to a hot gaseous medium to evaporate surplus solvent and then subjected to a main coating treatment by passage through a bath containing a plastic resin coating material followed by successive exposures to a hot gaseous medium to dry the wet coatings and to set and cure the plastic resin thereof after being dried, and thereafter mechanically chopping the travelling threads or roving having the cured plastic resin coatings to produce pellets or short pieces thereof adaptable for reinforcing purposes in plastics molding operations, the combination with the foregoing process steps of the step which comprises subjecting the continuously moving bundle of threads or roving to an electrical charge of a potential adequate to disarrange and produce wide spreading apart laterally of the filaments from each other as they move into the main coating bath and as thus spread apart individually become completely coated with the plastic resin contained therein.

3. In a continuous process for the production of plastic resin coated glass fibers in chopped form for plastics-reinforcing purposes wherein a continuously moving bundle of continuous filament threads or roving initially carrying a preliminary binder coating is subjected to treatment with a solvent to remove the preliminary binder followed by exposure to a hot gaseous medium to evaporate surplus solvent and then subjected to a main coating treatment by passage through a bath containing a plastic resin coating material followed by successive exposures to a hot gaseous medium to dry the wet coatings and to set and cure the plastic resin thereof after being dried, and thereafter mechanically chopping the travelling threads or roving having the cured plastic resin coatings to produce pellets or short pieces thereof adaptable for reinforcing purposes in plastics molding operations, the combination with the foregoing process steps of the steps of electropositively charging the filaments of the travelling bundle of threads or moving following removal of the preliminary binder therefrom and passing the positively charged filaments through an electrostatic field of negative polarity to cause ballooning and wide spreading apart laterally of the filaments from each other as they move into the main coating bath, and spraying a plastic resin coating on the filaments as thus-ballooned before they enter the main coating bath.

4. In a continuous process for the production of plastic resin coated glass fibers in chopped form for plastics-reinforcing purposes wherein a continuously moving bundle of continuous filament threads or roving initially carrying a preliminary binder coating is passed through a bath containing a solvent to remove the preliminary binder followed by exposure to a hot gaseous medium to remove surplus solvent by evaporation and then subjected to a main coating treatment by passage through a bath containing a plastic resin coating material followed by successive exposure of the travelling threads or roving to a hot gaseous medium to dry the wet coatings and to set and cure the plastic resin thereof after being dried, and finally mechanically chopping the travelling threads or rovings having the cured plastic resin coatings to produce pellets or short pieces therefrom adaptable for reinforcing purposes in plastic molding operations, the combination with the foregoing process steps of the steps of electropositively charging the filaments of the travelling bundle of threads or roving following removal of the preliminary binder therefrom and passing the positively charged filaments through an electrostatic field of negative polarity to cause ballooning and wide spreading apart laterally of the filaments from each other as they move into the main coating bath, and directing an electronegatively charged spray of plastic resin coating material on the filaments as thus-ballooned before they enter the main coating bath.

References Cited in the file of this patent

UNITED STATES PATENTS

| | | |
|---|---|---|
| 1,636,750 | Miller | July 26, 1927 |
| 2,142,397 | Hurst | Jan. 3, 1939 |
| 2,187,306 | Formhals | Jan. 16, 1940 |
| 2,385,916 | Hahn | Oct. 2, 1945 |
| 2,466,906 | Miller | Apr. 12, 1949 |
| 2,562,358 | Huebner | July 31, 1951 |